United States Patent
Nohl et al.

(10) Patent No.: US 12,503,106 B2
(45) Date of Patent: Dec. 23, 2025

(54) METHOD AND APPARATUS FOR AGGREGATING/REPRESENTING AN ENVIRONMENT MODEL FOR A DRIVER ASSISTANCE SYSTEM OF A VEHICLE

(71) Applicant: Knorr-Bremse Systeme Fuer Nutzfahrzeuge GmbH, Munich (DE)

(72) Inventors: Andreas Nohl, Knittlingen (DE); Oliver Maier, Korntal Muenchingen (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 190 days.

(21) Appl. No.: 18/552,769

(22) PCT Filed: Apr. 11, 2022

(86) PCT No.: PCT/EP2022/059594
§ 371 (c)(1),
(2) Date: Sep. 27, 2023

(87) PCT Pub. No.: WO2022/228875
PCT Pub. Date: Nov. 3, 2022

(65) Prior Publication Data
US 2024/0166203 A1 May 23, 2024

(30) Foreign Application Priority Data
Apr. 28, 2021 (EP) .................................. 21170962

(51) Int. Cl.
*B60W 30/095* (2012.01)
*B60W 40/10* (2012.01)
(Continued)

(52) U.S. Cl.
CPC .......... *B60W 30/095* (2013.01); *B60W 40/10* (2013.01); *B60W 50/14* (2013.01);
(Continued)

(58) Field of Classification Search
CPC ........... B60W 30/095; B60W 60/0027; B60W 40/10; B60W 50/14; B60W 2554/80; B60W 2050/146
See application file for complete search history.

(56) References Cited

U.S. PATENT DOCUMENTS

| 10,671,075 B1 | 6/2020 | Kobilarov |
| 2013/0124041 A1* | 5/2013 | Belser ................... G08G 1/168 701/41 |

(Continued)

FOREIGN PATENT DOCUMENTS

| CN | 112550287 A | 3/2021 |
| CN | 112572472 * | 3/2021 |
| CN | 112572472 A | 3/2021 |

OTHER PUBLICATIONS

Optimal_trajectory_generation_for_dynamic_street_scenarios_in_Frener_frame (Year: 2010).*
(Continued)

*Primary Examiner* — Mohamad O El Sayah
(74) *Attorney, Agent, or Firm* — NORTON ROSE FULBRIGHT US LLP

(57) ABSTRACT

A method of parametrizing an environment model (108) for a driver assistance system (106) of a vehicle (100) comprises steps of defining, determining and transforming. In the step of defining, a reference point (R) on a predicted trajectory (T) of the vehicle (100) is defined in relation to a detected object (OBJ) in an environment of the vehicle (100). In the step of determining, an angle ($\alpha_x$) between a tangent (tan) to the trajectory (T) in the reference point (R) and a first axis (x) of a vehicle coordinate system (K) and a relative distance (Continued)

between object (OBJ) and reference point (R) are determined, to obtain object-related information (115). In the step of transforming, the object-related information (115) is transformed according to the determined angle ($\alpha_x$) to a new coordinate system with its first axis tangential to the trajectory (T) in the reference point (R), to obtain parametrization data (117).

10 Claims, 3 Drawing Sheets

(51) Int. Cl.
*B60W 50/14* (2020.01)
*B60W 60/00* (2020.01)

(52) U.S. Cl.
CPC ... *B60W 60/0027* (2020.02); *B60W 2050/146* (2013.01); *B60W 2554/80* (2020.02)

(56) References Cited

U.S. PATENT DOCUMENTS

| | | | |
|---|---|---|---|
| 2018/0304890 A1* | 10/2018 | Sone | G05D 1/0088 |
| 2020/0070819 A1* | 3/2020 | Tominaga | B60W 50/0097 |
| 2021/0278225 A1* | 9/2021 | Fendler | B60W 30/16 |
| 2021/0380106 A1* | 12/2021 | Chinni | G05D 1/0238 |
| 2022/0097714 A1* | 3/2022 | Reshef | G06V 20/588 |
| 2024/0300541 A1* | 9/2024 | Dangel | G05D 1/0214 |

OTHER PUBLICATIONS

Machine translation of CN112572472 (Year: 2020).*
International Search Report for PCT/EP2022/059594, Issued Jun. 22, 2022.

* cited by examiner

METHOD AND APPARATUS FOR AGGREGATING/REPRESENTING AN ENVIRONMENT MODEL FOR A DRIVER ASSISTANCE SYSTEM OF A VEHICLE

FIELD OF THE INVENTION

The present invention relates to a method of parameterizing an environment model for a driver assistance system of a vehicle, to an apparatus for parameterizing an environment model for a driver assistance system of a vehicle and to a vehicle comprising said apparatus.

BACKGROUND INFORMATION

For driver assistant systems, such as ACC (Adaptive Cruise Control), AEBS (Advanced Emergency Braking System) and others, the driver as well as the environment with a certain variance define the future state of the ego vehicle. To make decisions, those systems consider one or more hypotheses of the predicted vehicle state for a certain prediction time period.

Patent document U.S. Pat. No. 10,671,075 B1 discusses a system configured to determine a reference trajectory for an autonomous vehicle to traverse an environment, determine first and second frames associated with the reference trajectory, the second frame associated with a tangent vector of a second point on the reference trajectory, determine a candidate trajectory of the autonomous vehicle, the candidate trajectory including a segment having an origin and a curvature value associated with the position of the autonomous vehicle and intersecting at an intersection point with a reference line that is substantially perpendicular to the tangent vector associated with the second point, the intersection point based at least in part on the curvature value.

SUMMARY OF THE INVENTION

Against this background, it is an object of the present invention to provide an improved method of parameterizing an environment model for a driver assistance system of a vehicle, an improved apparatus for parameterizing an environment model for a driver assistance system of a vehicle and an improved vehicle comprising said apparatus.

This object is achieved by a method of parameterizing an environment model for a driver assistance system of a vehicle, by an apparatus for parameterizing an environment model for a driver assistance system of a vehicle and by a vehicle comprising said apparatus according to the main claims.

Advantageously, according to embodiments, a reduction of the complexity of an environment model for driver assistant systems can be achieved. In particular, this can be achieved by transforming a vehicle's driving situation into a coordinate system that is tangential in the most relevant area of the ego vehicle lateral trajectory. Consequently, the ego vehicle trajectory can be simplified into a straight movement in the most relevant area. In order to make decisions on possible hazards, increase of comfort or driving efficiency and other criteria, the ego vehicle trajectory is used to determine possible changes relating to surrounding objects, such as possible collisions, changes in distances and others by calculations. Depending on a representation of the ego vehicle trajectory and the trajectory of surrounding objects in the environment model, according to embodiments, these calculations may be numerical calculations with reduced complexity which take less computational effort and are less error-prone than conventional solutions. Since such systems can be considered as safety critical, they are also more comprehensible.

A method of parameterizing an environment model for a driver assistance system of a vehicle comprises the steps of:
defining a reference point on a predicted trajectory of the vehicle, wherein the reference point is defined in relation to a detected object in an environment of the vehicle,
determining an angle between a tangent to the trajectory in the reference point and a first coordinate axis of a vehicle coordinate system and a relative distance between the object and the reference point with reference to the vehicle coordinate system, in order to obtain object-related information; and
transforming the object-related information according to the determined angle to a new coordinate system with its first coordinate axis tangential to the trajectory in the reference point, in order to obtain parameterization data for parameterizing the environment model, wherein the parameterization data represents the trajectory as a straight movement with respect to the object.

The vehicle may be a motor vehicle, such as a passenger car, utility vehicle or commercial vehicle, for example a truck, bus or the like. Parameterizing the environment model may comprise aggregating and/or representing the environment model. The environment model may represent an environment of the vehicle, including the predicted trajectory of the vehicle, objects in the environment, object trajectories and additionally or alternatively other environment information, for example one or more hypotheses of the predicted vehicle state for a certain prediction time period. A hypothesis of the future vehicle state for the predicted time period, which may also be referred to as the predicted trajectory or ego vehicle trajectory, may be estimated using different sources, such as sensor information within the vehicle or ego vehicle, driver monitoring information and additionally or alternatively observed environmental information. The predicted trajectory or ego vehicle trajectory may be represented in different ways, such as geometrical driving corridors, sets of states, analytical representations such as polynomial functions, probabilistic representations and others. The reference point being defined in relation to the detected object may be understood as the reference point being defined within a predetermined maximum or minimum distance from the object or so as to meet another relative requirement with respect to the object. The vehicle coordinate system may be defined by a longitudinal axis of the vehicle and a lateral axis of the vehicle. The first coordinate axis may correspond to the longitudinal axis, whereas a second coordinate axis of the vehicle coordinate system may correspond to the lateral axis. The parameterization data may exclude a lateral part of the trajectory.

According to an embodiment, in the step of defining, an intersection point between a simplified object movement path and the trajectory may be ascertained so as to define the reference point. According to another embodiment, in the step of defining, the nearest point between a simplified object movement path and the trajectory may be ascertained so as to define the reference point. According to a further embodiment, in the step of defining, a distance between the object and the vehicle along the first coordinate axis of the vehicle coordinate system may be used as the distance between the vehicle and the reference point along the first coordinate axis of the vehicle coordinate system to define a first position value of the reference point, and a second position value of the reference point relative to a second coordinate axis of the vehicle coordinate system may be ascertained on the basis of the first position value. Such embodiments offer the advantage that the reference point can be defined in an accurate and reliable manner.

According to an embodiment, the method may also comprise a step of acquiring sensor data from an interface to an environment sensor of the vehicle, wherein the sensor data represents the environment of the vehicle. Additionally or alternatively the method may also comprise a step of processing the sensor data to detect the object. According to an embodiment, the method may further comprise a step of providing the parameterization data to be output to an interface to the driver assistance system.

An apparatus for parameterizing an environment model for a driver assistance system of a vehicle comprises:
- a defining unit for defining a reference point on a predicted trajectory of the vehicle, wherein the reference point is defined in relation to a detected object in an environment of the vehicle;
- a determining unit for determining an angle between a tangent to the trajectory in the reference point and a first coordinate axis of a vehicle coordinate system and a relative distance between the object and the reference point with reference to the vehicle coordinate system, in order to obtain object-related information; and
- a transforming unit for transforming the object-related information according to the determined angle to a new coordinate system with its first coordinate axis tangential to the trajectory in the reference point, in order to obtain parameterization data for parameterizing the environment model, wherein the parameterization data represents the trajectory as a straight movement with respect to the object.

The apparatus may be configured to execute an embodiment of the aforementioned method or steps thereof. In other words, the approach presented here further provides an apparatus configured to perform, control or implement the steps of an embodiment of the aforementioned method in corresponding devices or units. The apparatus may be configured to read input signals and to determine and provide output signals using the input signals. For example, an input signal may represent a sensor signal readable via an input interface of the apparatus. An output signal may represent a control signal or a data signal which can be provided at an output interface of the apparatus. The apparatus may be configured to determine the output signals using a processing rule implemented in hardware or in software. For example, the apparatus may comprise a logic circuit, an integrated circuit or a software module and may, for example, be realized as a discrete component or be included in a discrete component.

A vehicle comprises an embodiment of the aforementioned apparatus and the driver assistance system, wherein the apparatus and the driver assistance system are communicatively connected to each other.

The vehicle may be a motor vehicle, such as a passenger car, utility vehicle or commercial vehicle, for example a truck, bus or the like.

What is also advantageous is a computer program product having program code which may be stored on a machine-readable carrier, such as semiconductor memory, hard disk or optical memory, and is used for performing the method one of the previously described embodiments, when the program product is executed on a computer or an apparatus.

Embodiments of the approach presented here shall be explained in greater detail in the subsequent description with reference to the figures.

In the following description of advantageous embodiments of the present invention, the same or similar reference numerals shall be used for the elements depicted in the various figures and acting in a similar way, wherein repeated description of these elements shall be omitted.

DETAILED DESCRIPTION

Figure 1:
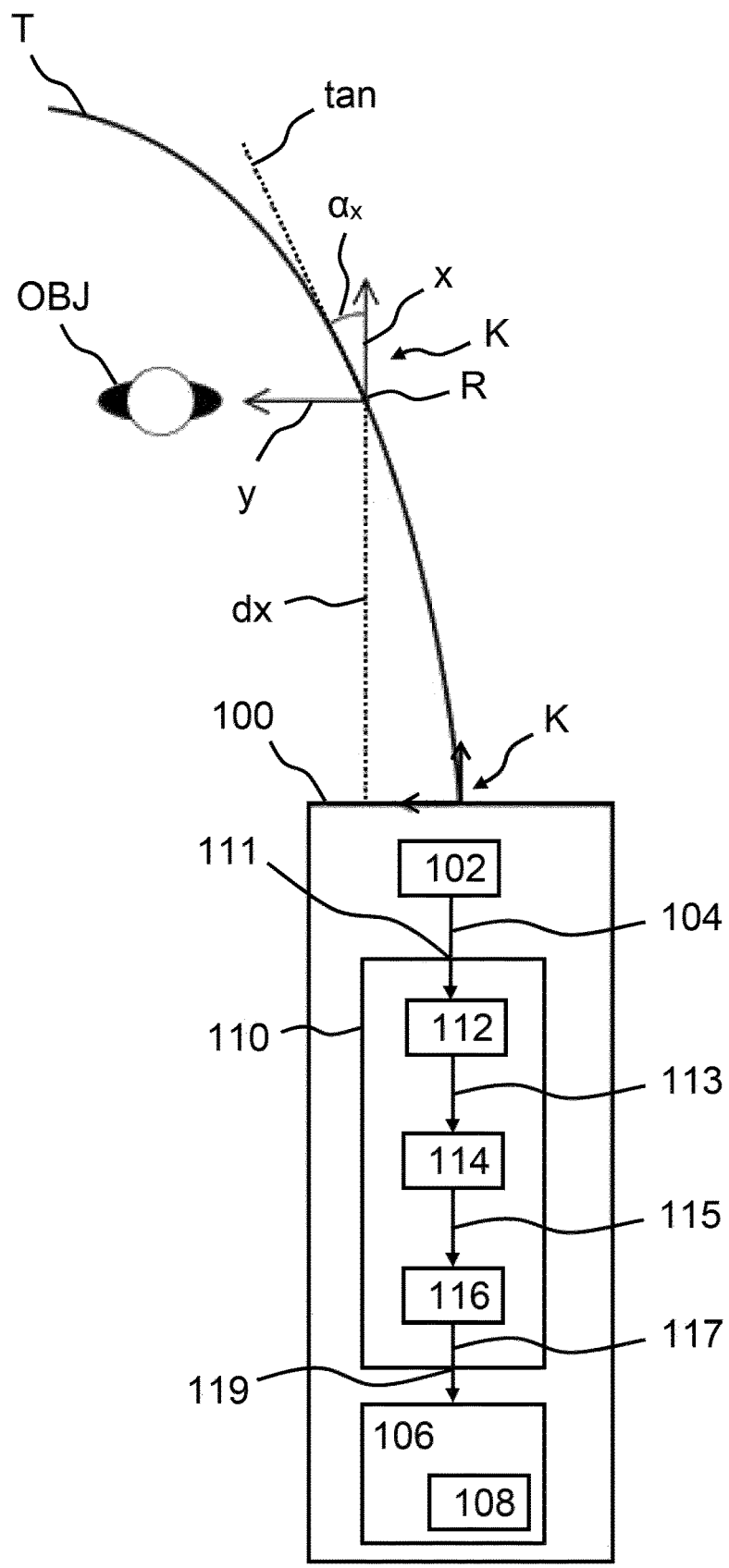
FIG. 1 shows a schematic illustration of a vehicle comprising an embodiment of an apparatus for parameterizing an environment model for a driver assistance system of the vehicle.

FIG. 1 shows a schematic illustration of a vehicle 100 comprising an embodiment of an apparatus 110 for parameterizing an environment model 108 for a driver assistance system 106 of the vehicle 100. The vehicle 100 is configured as an autonomous vehicle or a semi-autonomous vehicle, for example. The vehicle 100 is a motor vehicle, such as a passenger car, utility vehicle or commercial vehicle, for example a truck, bus or the like.

In an environment of the vehicle 100, which is to be described by the environment model 108, FIG. 1 shows a detected object OBJ, which is illustrated so as to represent a person here by way of example only. Furthermore, a trajectory or predicted trajectory T of the vehicle 100 is illustrated in the environment. The trajectory T here is illustrated as a curved line.

The vehicle 100 also comprises the driver assistance system 106, including the environment model 108. According to an embodiment, the vehicle 100 comprises a plurality of driver assistance systems 106. The apparatus 110 and the driver assistance system 106 are communicatively connected to each other.

The apparatus 110 is configured to parameterize the environment model 108 for the driver assistance system 106 of the vehicle 100. In other words, the apparatus 110 is configured to execute a method of parameterizing the environment model 108 for the driver assistance system 106 of the vehicle 100, such as a method as described with reference to FIG. 3. The apparatus 110 comprises a defining unit 112, a determining unit and a transforming unit 116.

The defining unit 112 of the apparatus 110 is configured to define a reference point R on the predicted trajectory T of the vehicle 100. In particular, the defining unit 112 is configured to define the reference point R in relation to the detected object OBJ in the environment of the vehicle 100. Here, in relation to may mean within a predetermined range or pursuant to another geographical or geometric criterion, for example. The defining unit 112 also is configured to produce definition data 113 representing the defined reference point R.

The determining unit 114 of the apparatus 110 is configured to determine an angle $\alpha_x$ between a tangent tan to the trajectory T in the reference point R and a first coordinate axis x of a vehicle coordinate system K. The determining unit 114 is also configured to determine a relative distance between the object OBJ and the reference point R with reference to the vehicle coordinate system K, in order to obtain object-related information 115.

The vehicle coordinate system K comprises the first coordinate axis x and a second coordinate axis y. The first coordinate axis x here corresponds to a longitudinal axis of the vehicle 100. The second coordinate axis y corresponds to a lateral axis of the vehicle 100.

The transforming unit 116 of the apparatus 100 is configured to transform the object-related information 115 according to the determined angle $\alpha_x$ to a new coordinate system with its first coordinate axis tangential to the trajectory T in the reference point R, in order to obtain parameterization data 117 for parameterizing the environment model 108. The parameterization data 117 represents the trajectory T as a straight movement with respect to the object OBJ. According to an embodiment, the apparatus 110 is configured to provide the parameterization data 117 to be output to an interface or output interface 119 of the apparatus 110 to the driver assistance system 106.

According to an embodiment, the apparatus 110 is also configured to acquire sensor data 100 for from an interface or input interface 111 of the apparatus 110 to an environment sensor 102 of the vehicle 100. The sensor data 104 represents the environment of the vehicle 100, more specifically the environment in a form as sensed by the environment sensor 102. Thus, the sensor data 104 also represent the object OBJ if present in the environment. Additionally or alternatively, the apparatus 110 is also configured to process the sensor data 104 to detect the object OBJ.

Optionally, the defining unit 112 is configured to use a distance between the object OBJ and the vehicle 100 along the first coordinate axis x of the vehicle coordinate system K as a distance dx between the vehicle 100 and the reference point R along the first coordinate axis x of the vehicle coordinate system K to define a first position value of the reference point R. Furthermore, the defining unit 112 here is configured to ascertain a second position value of the reference point R relative to the second coordinate axis y of the vehicle coordinate system K on the basis of said first position value.

Figure 2:
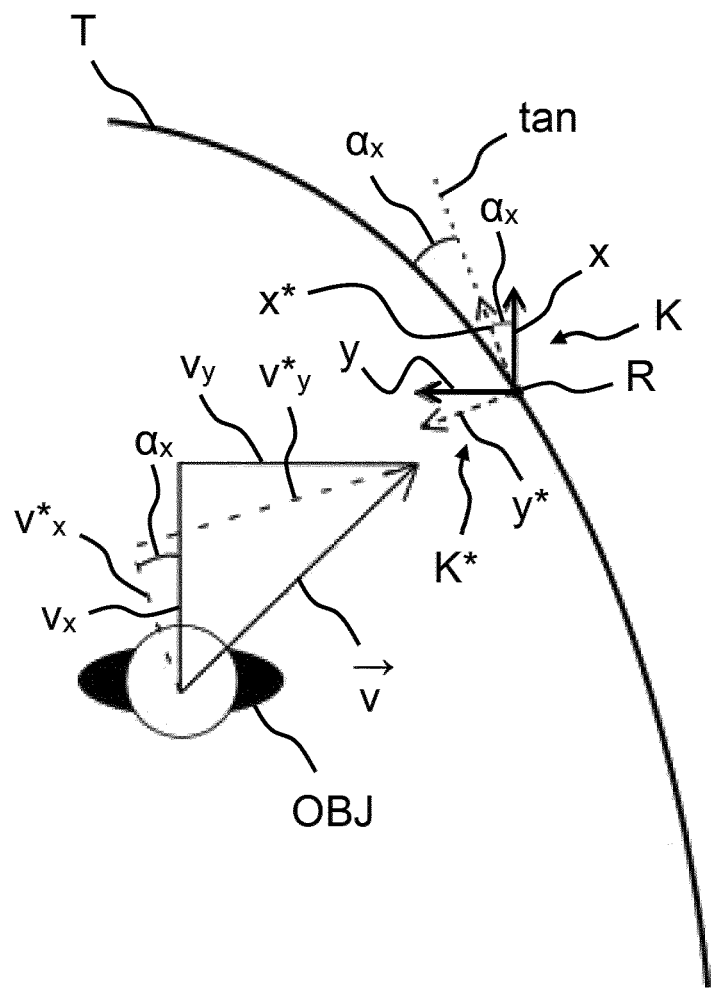
FIG. 2 shows a schematic illustration of the environment of the vehicle from FIG. 1 at a later parameterization stage.

FIG. 2 shows a schematic illustration of the environment of the vehicle from FIG. 1 at a later parameterization stage. In addition to the object OBJ, the trajectory T, the reference point R the tangent tan, determined angle $\alpha_x$ and the vehicle coordinate system K with its axes x and y, as already shown in FIG. 1, FIG. 2 also shows the new coordinate system K* with its axes x* and y*, with its first coordinate axis x* aligned with the tangent tan, and a simplified object movement or simplified object movement path $\vec{v}$ with a first set of components $v_x$ and $v_y$ pursuant to the vehicle coordinate system K and a second set of components pursuant to the new coordinate system K*.

Optionally, the defining unit of the apparatus is configured to ascertain an intersection point between the simplified object movement path $\vec{v}$ and the trajectory T so as to define the reference point R. Additionally or alternatively, the defining unit of the apparatus is configured to ascertain the nearest point between the simplified object movement path $\vec{v}$ and the trajectory T so as to define the reference point R.

In other words, to reduce the complexity of the environment model, for each considered object OBJ, the following steps may be executed by the apparatus, for example: Define reference point on the predicted trajectory T in order to estimate the angle $\alpha_x$ to the trajectory T. For the reference point R, one of the following strategies is used: Use the x distance of the object OBJ as x value of the trajectory T and calculate the y value based on x. Calculate the intersection point between a simplified object movement $\vec{v}$ with the trajectory T. Calculate the nearest point between a simplified object movement v with the trajectory T.

Calculate the angle $\alpha_x$ and the relative x-/y-distance from the object OBJ to the reference point R.

Transform the object-related information according to the calculated angle $\alpha_x$ to a new reference frame K*.

After the transformation, for the specific object OBJ, the lateral part of the trajectory T can be neglected. This reduces the complexity for the decision making.

Figure 3:
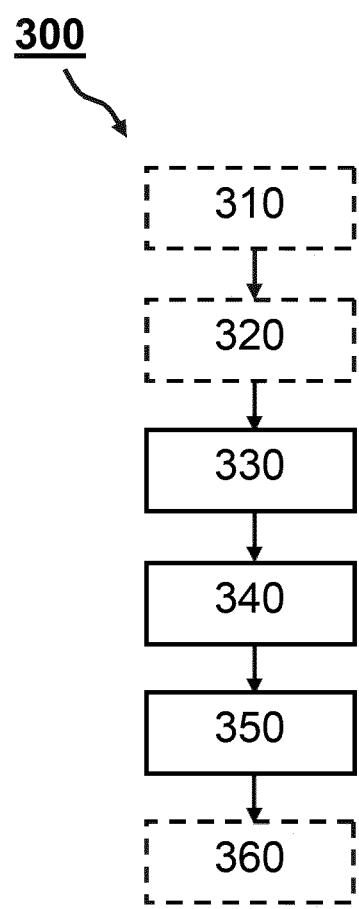
FIG. 3 shows a flowchart of an embodiment of a method of parameterizing an environment model for a driver assistance system of a vehicle.

FIG. 3 shows a flowchart of an embodiment of a method 300 of parameterizing an environment model for a driver assistance system of a vehicle. The method 300 is executable by the apparatus as described with reference to FIG. 1 or a similar apparatus. The method 300 comprises a step 330 of defining, a step 340 of determining and a step 350 of transforming.

In the step 330 of defining, a reference point is defined on a predicted trajectory of the vehicle. The reference point is defined in relation to a detected object in an environment of the vehicle. Subsequently, in the step 340 of determining, an angle between a tangent to the trajectory in the reference point and a first coordinate axis of a vehicle coordinate system and a relative distance between the object and the reference point with reference to the vehicle coordinate system are determined, in order to obtain object-related information. Subsequently, in the step 350 of transforming, the object-related information is transformed according to the determined angle to a new coordinate system with its first coordinate axis tangential to the trajectory in the reference point, in order to obtain parameterization data for parameterizing the environment model. The parameterization data represents the trajectory as a straight movement with respect to the object.

According to an embodiment, the method 300 further comprises a step 310 of acquiring and/or a step 320 of processing. In the step 310 of acquiring, sensor data from an interface to an environment sensor of the vehicle is acquired. The sensor data represents the environment of the vehicle. Thus, the sensor data may also represent the object if present in the environment. In the step 320 processing, the sensor data is processed to detect the object. According to a further embodiment, the method 300 also comprises a step 360 of providing. In the step 360 of providing, the parameterization data is provided to be output to an interface to the driver assistance system.

REFERENCE NUMERAL LIST 100 vehicle
102 environment sensor
104 sensor data
106 driver assistance system
108 environment model
110 apparatus for parameterizing
111 input interface
112 defining unit
113 definition data
114 determining unit
115 object-related information
116 transforming unit
117 parameterization data
119 output interface
$\alpha_x$ determined angle
dx distance between vehicle and reference point along first coordinate axis of vehicle coordinate system
K vehicle coordinate system
OBJ detected object
R reference point
T trajectory
tan tangent
x first coordinate axis of vehicle coordinate system
y second coordinate axis of vehicle coordinate system
K* new coordinate system
$\vec{v}$ simplified object movement path
$v_x$, $v_y$ first set of components of simplified object movement path
$v^*_x$, $v^*_y$ second set of components of simplified object movement path
x* first coordinate axis of new coordinate system
y* second coordinate axis of new coordinate system
300 method of parameterizing
310 step of acquiring
320 step of processing
330 step of defining
340 step of determining
350 step of transforming
360 step of providing

The invention claimed is:

1. A method for parameterizing an environment model for a driver assistance system of a vehicle, the method comprising:
  acquiring, using an environment sensor of the vehicle, sensor data representing an environment of the vehicle;
  detecting an object present in the environment of the vehicle, using the sensor data;
    defining a reference point on a predicted trajectory of the vehicle, wherein the reference point is defined in relation to the detected object in the environment of the vehicle;
    determining: (i) an angle between a tangent to the predicted trajectory at the reference point and a first coordinate axis of a vehicle coordinate system, wherein the vehicle coordinate system is defined by a longitudinal axis of the vehicle and a lateral axis of the vehicle, the first coordinate axis being the longitudinal axis of the vehicle, and (ii) a relative distance between the detected object and the reference point with reference to the vehicle coordinate system, so as to obtain object-related information; and
      obtaining parameterization data for the environment model by transforming the object-related information according to the determined angle to a new coordinate system with its first coordinate axis tangential to the predicted trajectory at the reference point;
  wherein the obtained parameterization data represents the predicted trajectory as a straight movement with respect to the detected object;
  providing the obtained parameterization data for the environment model to an interface of the driver assistance system of the vehicle; and
  controlling the vehicle by the driver assistance system, using the environment model and the obtained parameterization data for the environment model.

2. The method of claim 1, wherein an intersection point, between a simplified object movement path and the predicted trajectory of the vehicle, is ascertained to define the reference point on the predicted trajectory of the vehicle.

3. The method of claim 1, wherein a nearest point, between a simplified object movement path and the predicted trajectory of the vehicle, is ascertained, to define the reference point on the predicted trajectory of the vehicle.

4. The method of claim 1, wherein a distance, between the detected object and the vehicle along the first coordinate axis of the vehicle coordinate system, is used as a distance between the vehicle and the reference point along the first coordinate axis of the vehicle coordinate system to define a first position value of the reference point, and a second position value of the reference point relative to a second coordinate axis of the vehicle coordinate system is ascertained based on the first position value.

5. The method of claim 1, wherein the controlling of the vehicle includes using adaptive cruise control or controlling emergency braking.

6. A vehicle, comprising:
  an environment sensor;
  an apparatus for parameterizing an environment model for a driver assistance system of the vehicle, the apparatus including a logic circuit or an integrated circuit or computer hardware, wherein the apparatus configured to acquire, using the environment sensor, sensor data, and detect an object present in the environment of the vehicle, using the sensor data, and wherein the apparatus includes:
    a defining unit for defining a reference point on a predicted trajectory of the vehicle, wherein the reference point is defined in relation to the detected object in the environment of the vehicle,
    a determining unit for determining: (i) an angle between a tangent to the predicted trajectory at the reference point and a first coordinate axis of a vehicle coordinate system, wherein the vehicle coordinate system is defined by a longitudinal axis of the vehicle and a lateral axis of the vehicle, the first coordinate axis being the longitudinal axis of the vehicle, and (ii) a relative distance between the detected object and the reference point with reference to the vehicle coordinate system, so as to obtain object-related information, and
    a transforming unit configured to obtain parameterization data for the environment model by transforming the object-related information according to the determined angle to a new coordinate system with its first coordinate axis tangential to the predicted trajectory at the reference point,
  wherein the parameterization data represents the trajectory as a straight movement with respect to the detected object,
  wherein the apparatus is configured to provide the obtained parameterization data for the environment model to an interface of the driver assistance system of the vehicle; and
  the driver assistance system configured to control the vehicle using the environment model and the obtained parameterization data for the environment model;
  wherein the apparatus and the driver assistance system are communicatively connected to each other.

7. The vehicle of claim 6, wherein the driver assistance system controls the vehicle using adaptive cruise control or emergency braking.

8. A non-transitory computer readable medium having a computer program, which is executable by a processor, comprising:
  a program code arrangement having program code for parameterizing an environment model for a driver assistance system of a vehicle, by performing the following:

acquiring, using an environment sensor of the vehicle, sensor data representing an environment of the vehicle;

detecting an object present in the environment of the vehicle, using the sensor data;

defining a reference point on a predicted trajectory of the vehicle, wherein the reference point is defined in relation to the detected object in the environment of the vehicle;

determining: (i) an angle between a tangent to the predicted trajectory at the reference point and a first coordinate axis of a vehicle coordinate system, wherein the vehicle coordinate system is defined by a longitudinal axis of the vehicle and a lateral axis of the vehicle, the first coordinate axis being the longitudinal axis of the vehicle, and (ii) a relative distance between the detected object and the reference point with reference to the vehicle coordinate system, so as to obtain object-related information; and obtaining parameterization data for the environment model by transforming the object-related information according to the determined angle to a new coordinate system with its first coordinate axis tangential to the predicted trajectory at the reference point;

wherein the obtained parameterization data represents the predicted trajectory as a straight movement with respect to the detected object;

providing the obtained parameterization data for the environment model to an interface of the driver assistance system of the vehicle; and controlling the vehicle by the driver assistance system, using the environment model and the obtained parameterization data for the environment model.

9. The computer readable medium of claim 8, wherein a distance, between the detected object and the vehicle along the first coordinate axis of the vehicle coordinate system, is used as a distance between the vehicle and the reference point along the first coordinate axis of the vehicle coordinate system to define a first position value of the reference point, and a second position value of the reference point relative to a second coordinate axis of the vehicle coordinate system is ascertained based on the first position value.

10. The non-transitory computer readable medium of claim 8, wherein the controlling of the vehicle includes using adaptive cruise control or controlling emergency braking.

\* \* \* \* \*